June 25, 1963  R. J. MUELLER ETAL  3,094,918
BREWING APPARATUS
Filed Aug. 20, 1959  7 Sheets-Sheet 1

INVENTORS.
Richard J. Mueller &
Carl Weber
By: Merriam, Johnston,
Cook & Root Attys.

June 25, 1963 R. J. MUELLER ETAL 3,094,918
BREWING APPARATUS
Filed Aug. 20, 1959 7 Sheets-Sheet 3

INVENTORS,
Richard J. Mueller &
By: Carl Weber
Mayall, Johnston,
Cook & Root Attys.

June 25, 1963  R. J. MUELLER ETAL  3,094,918
BREWING APPARATUS
Filed Aug. 20, 1959  7 Sheets-Sheet 4
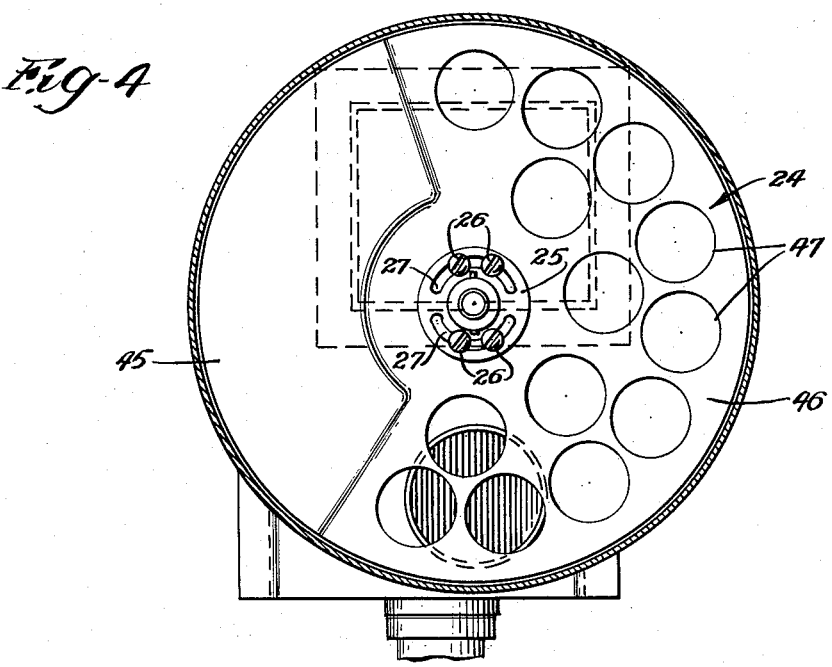
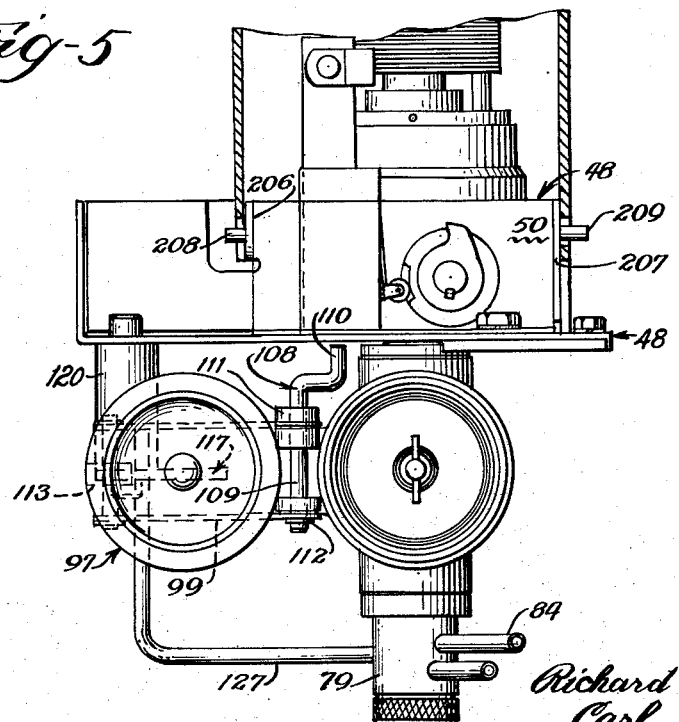
INVENTORS.
Richard J. Mueller &
Carl Weber June 25, 1963  R. J. MUELLER ETAL  3,094,918
BREWING APPARATUS
Filed Aug. 20, 1959  7 Sheets-Sheet 5
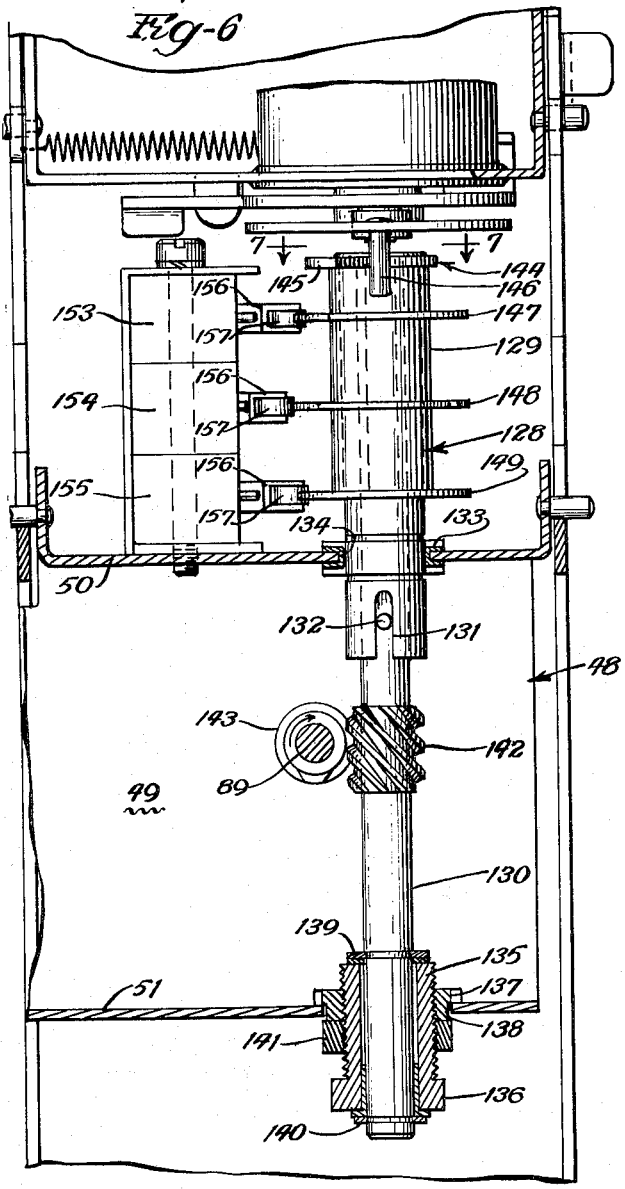
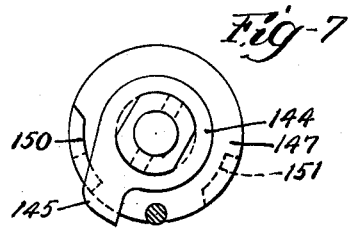
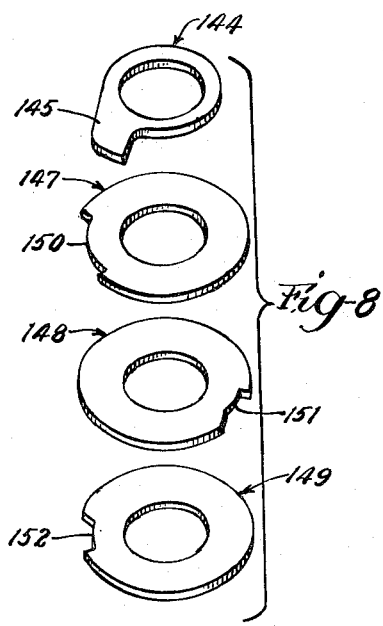
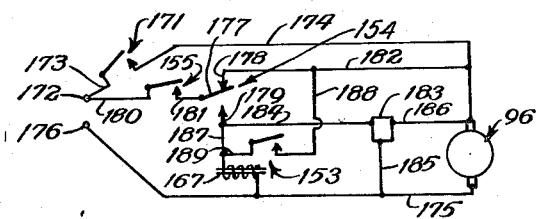
INVENTORS.
Richard J. Mueller &
Carl Weber June 25, 1963 R. J. MUELLER ETAL 3,094,918
BREWING APPARATUS
Filed Aug. 20, 1959 7 Sheets-Sheet 6
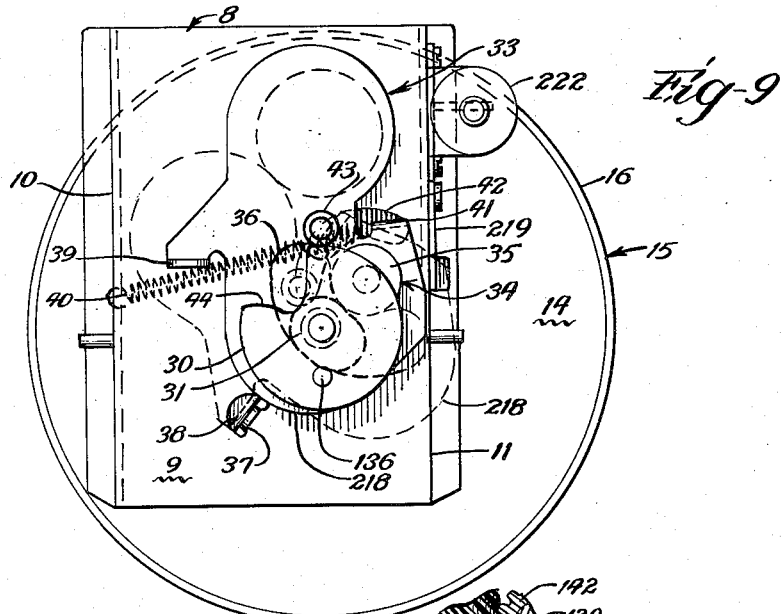
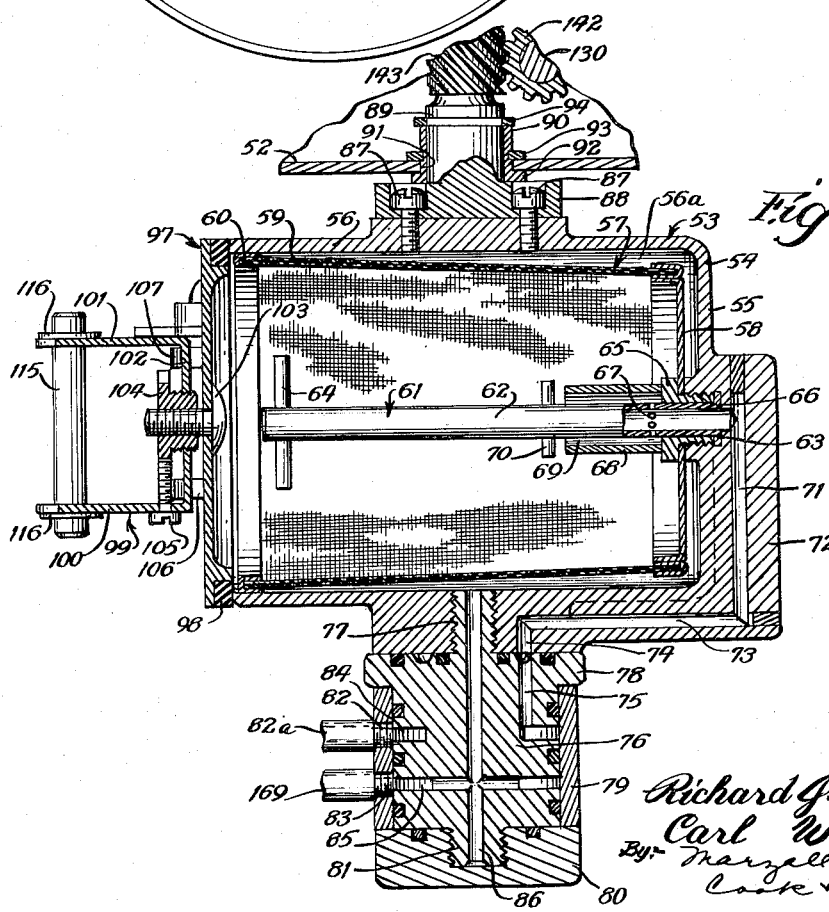
INVENTORS.
Richard J. Mueller +
Carl Weber
By: Marzall, Johnston, Cook & Root
Attys.

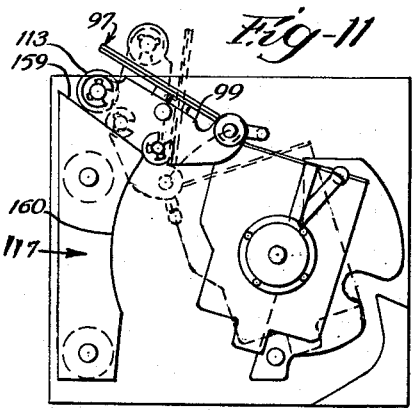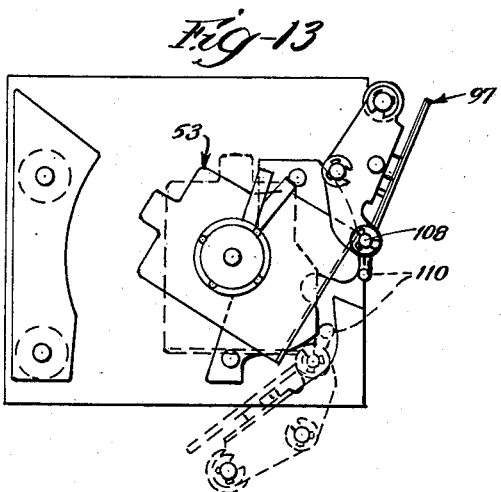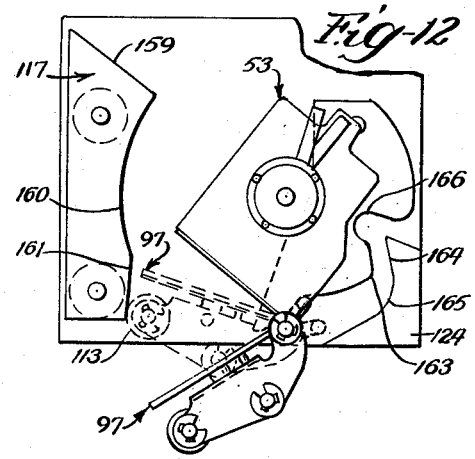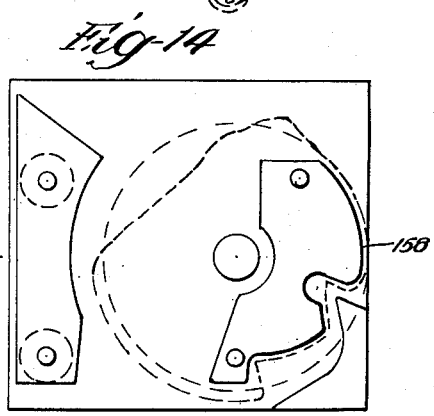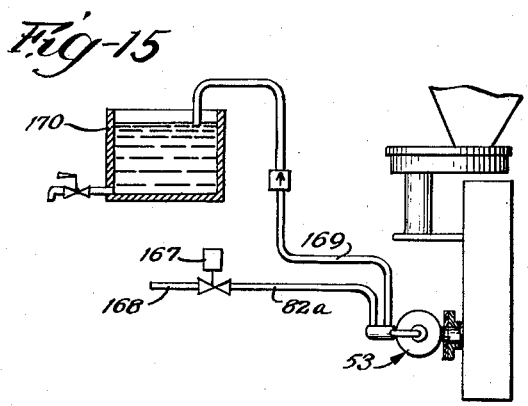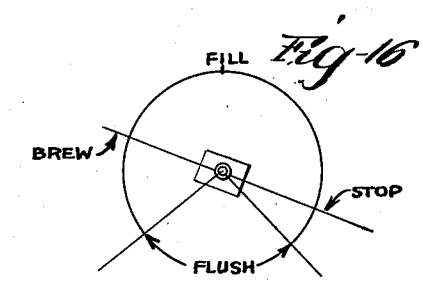

United States Patent Office 3,094,918
Patented June 25, 1963

3,094,918
BREWING APPARATUS
Richard J. Mueller, Franklin Park, and Carl Weber, Chicago, Ill., assignors to Automatic Canteen Company of America, Chicago, Ill., a corporation of Delaware
Filed Aug. 20, 1959, Ser. No. 834,986
12 Claims. (Cl. 99—289)

This invention relates to brewing apparatus and, more particularly, to brewing apparatus which is particularly well adapted for brewing hot beverages such as coffee, tea, and the like.

It is a primary object of the present invention to afford a novel brewing apparatus of the aforementioned general type.

It will be appreciated by those skilled in the art that although for purposes of illustration the present invention is disclosed herein as embodied in a coffee brewing apparatus, this is merely by way of illustration and not by way of limitation, and that the present invention may, if desired, be embodied in other brewing apparatus such as, for example, tea brewing apparatus, and the like.

The present invention relates, in general, to beverage brewing apparatus of a type wherein a brewing material is fed into a brewing container, and a brewing liquid is then fed into the container and brewed liquid is discharged therefrom while the container is maintained in closed condition. Thereafter, the container is dumped, and the interior thereof is flushed with a suitable flushing liquid such as water.

It is another object of the present invention to afford a novel brewing apparatus for coffee, and the like, embodying parts constituted and arranged in a novel and expeditious manner.

Another object is to provide a novel brewing apparatus of the aforementioned type embodying novel actuating mechanism for the cover of a brewing container.

A further object of the present invention is to enable brewing material to be fed into such a brewing container in a novel and expeditious manner.

An object ancillary to the foregoing is to provide a novel dispenser embodying novel cover plate and actuating mechanism therefor, constituted and arranged in a novel and expeditious manner.

Yet another object of the present invention is to enable the operation of various portions of such a brewing apparatus to be timed in a novel and expeditious manner.

A further object of the present invention is to afford novel adjusting means for such a timing mechanism.

An additional object of the present invention is to afford novel timing apparatus of the aforementioned type embodying rotatable shafts constituted and arranged relative to each other in a novel and expeditious manner and wherein one of the shafts is adjustable relative to the other in a novel manner.

Another object of the present invention is to enable component parts of such a novel brewing apparatus, or the like, to be supported therein in a novel and expeditious manner.

A further object of the present invention is to afford novel latching mechanism for holding component parts in operative position in brewing apparatus, and the like.

Another object of the present invention is to afford novel brewing apparatus of the aforementioned general type which is practical and efficient in operation and may be readily and economically produced commercially.

Other and further objects of the present invention will be apparent from the following description and claims and are illustrated in the accompanying drawings which, by way of illustration, show the preferred embodiment of the present invention and the principles thereof, and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 4 is a detail sectional view taken substantially along the line 4—4 in FIG. 1;

FIG. 5 is a detail sectional view taken substantially along the line 5—5 in FIG. 1 but showing the brewing container in a different operative position;

FIG. 6 is a detail sectional view taken substantially along the line 6—6 in FIG. 3;

FIG. 7 is a detail top plan view looking in the direction of the arrow 7—7 in FIG. 6;

FIG. 8 is an exploded view of the cams shown in FIGS. 6 and 7;

FIG. 9 is a bottom plan view of the dispenser mechanism embodied in the apparatus shown in FIG. 1;

FIG. 10 is a longitudinal sectional view taken substantially along the line 10—10 in FIG. 1;

FIGS. 11, 12 and 13 are detail front elevational views of a portion of the brewing apparatus shown in FIG. 1 showing parts of the apparatus in different operative positions;

FIG. 14 is a front elevational view of a portion of the apparatus shown in FIG. 1, diagrammatically showing the path of movement of a part of the brewing apparatus;

FIG. 15 is a somewhat diagrammatic view of an entire system in which the brewing apparatus of the present invention may be utilized;

FIG. 16 is a diagrammatic view of the cycle of operation of the brewing container according to the preferred form of the present invention; and FIG. 17 is a wiring diagram of the brewing apparatus shown in FIG. 1.

Figure 1:
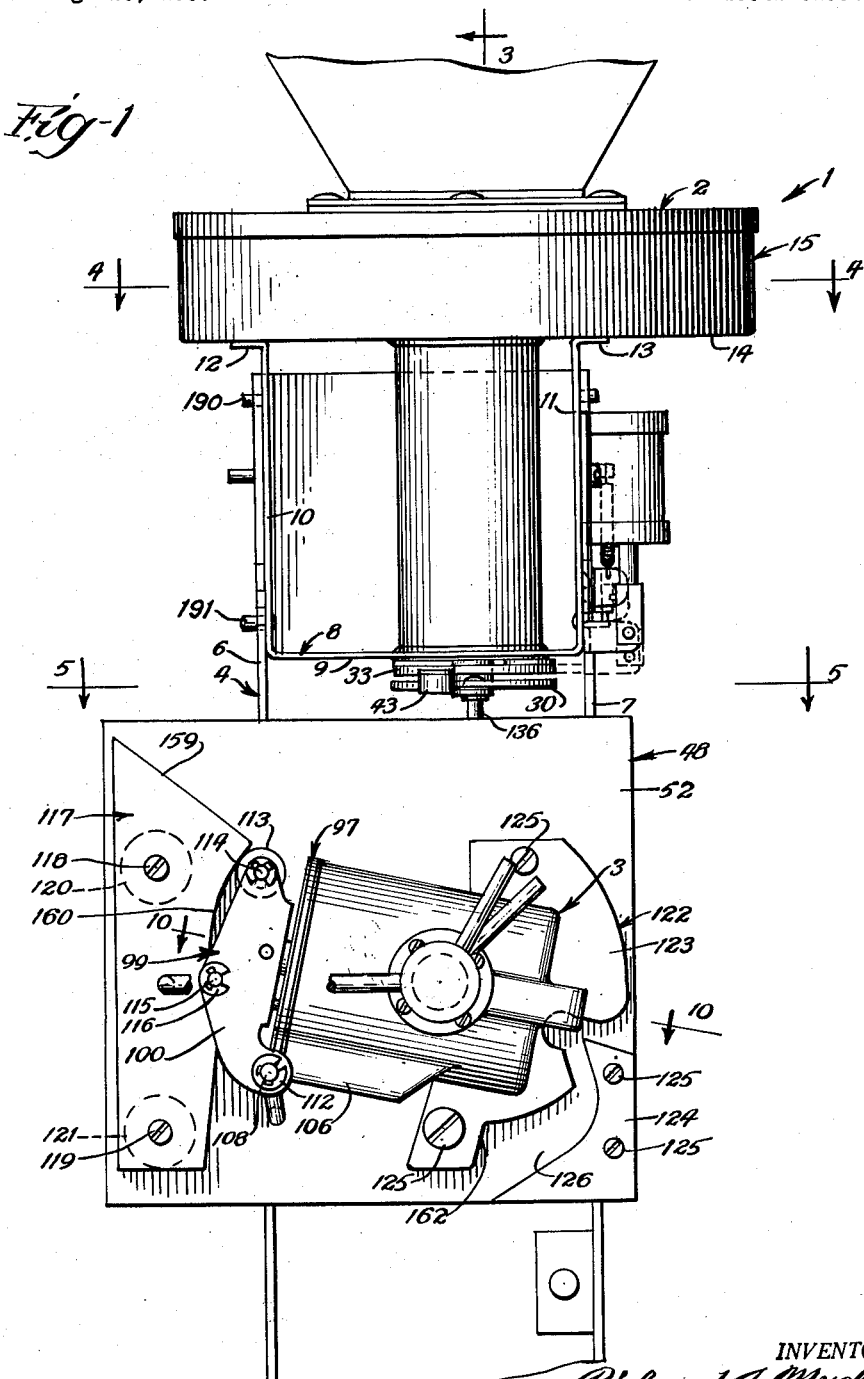
FIG. 1 is a front elevational view, with some parts broken away, of a brewing apparatus embodying the principles of the present invention.

In the drawings, a brewing apparatus 1, embodying the principles of the present invention is shown to illustrate the preferred embodiment of the present invention.

Figure 2:
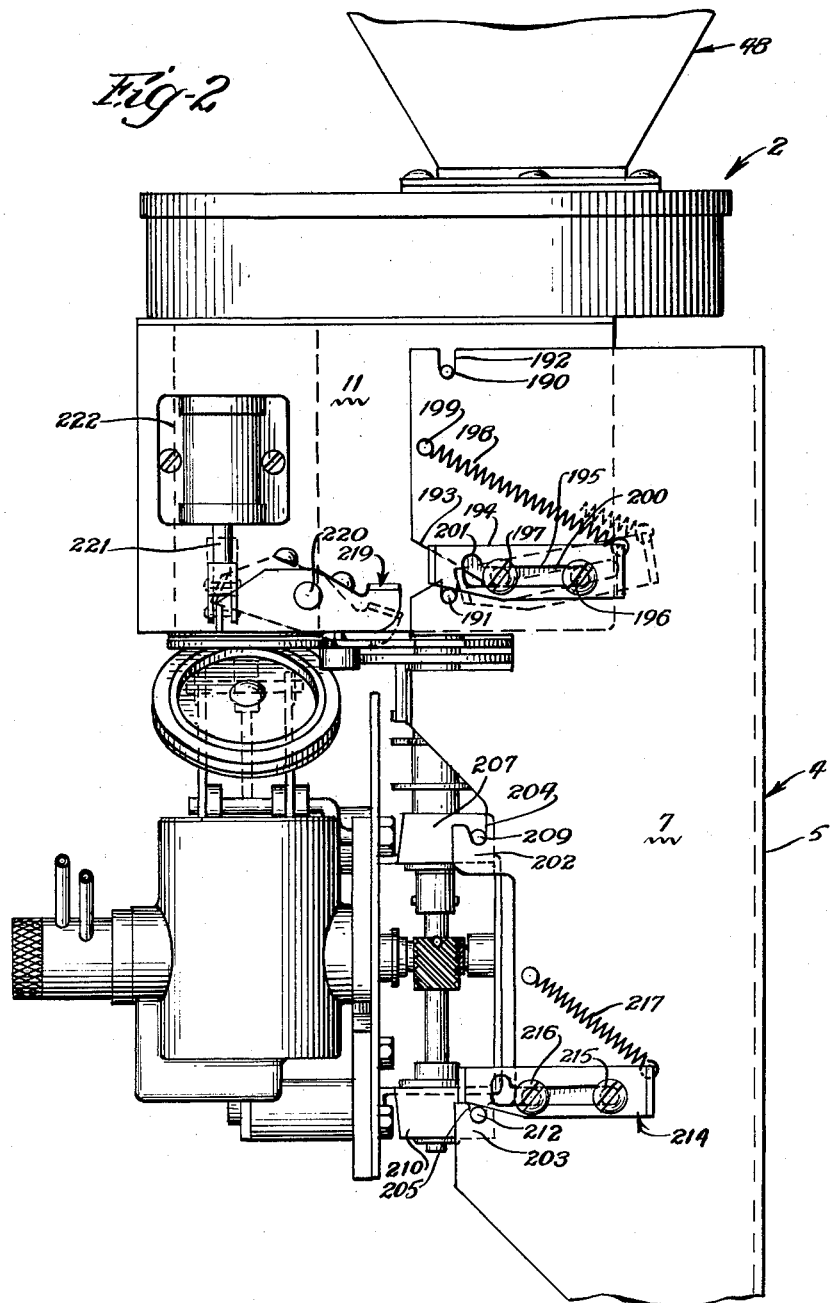
FIG. 2 is a side elevational view of the brewing apparatus shown in FIG. 1.
Figure 3:
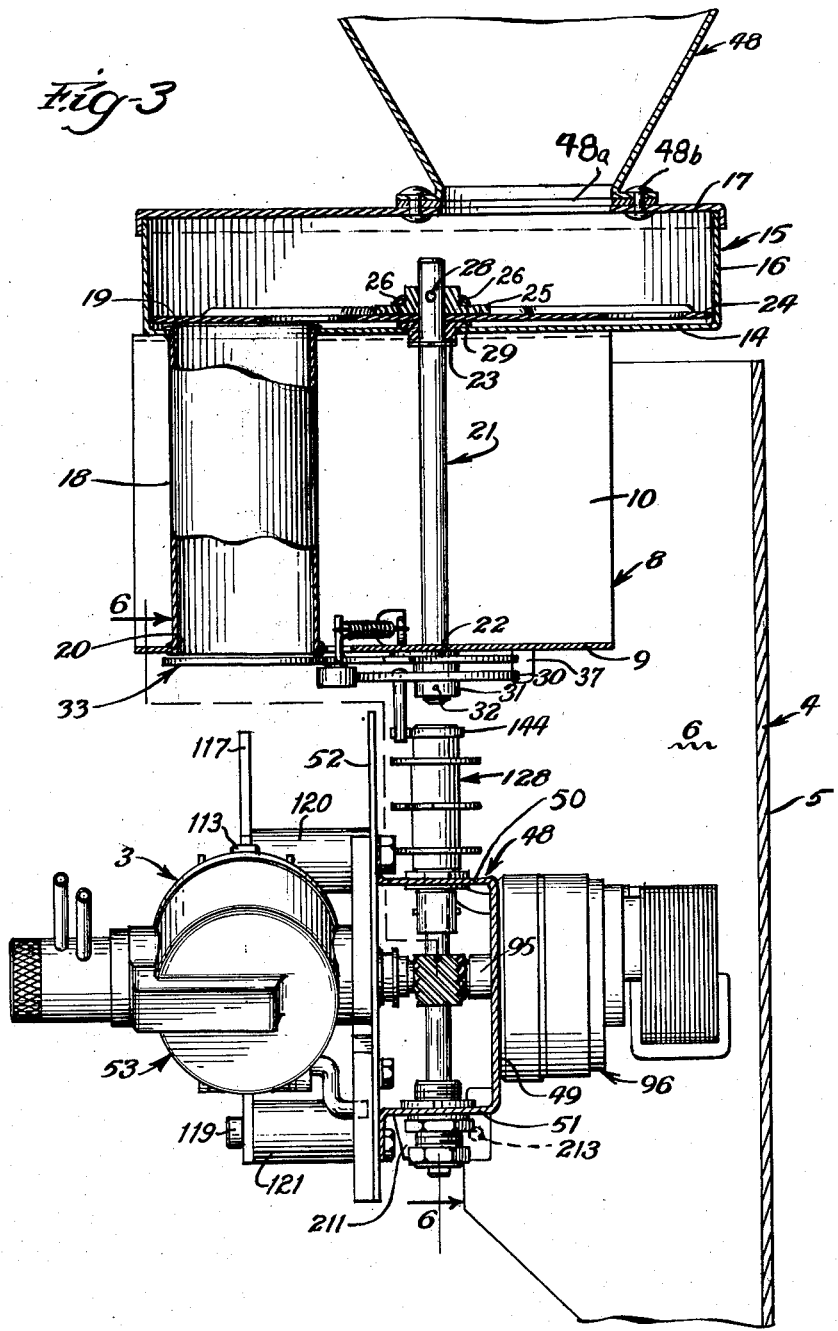
FIG. 3 is a longitudinal sectional view taken substantially along the line 3—3 in FIG. 1.

The brewing apparatus 1 includes, in general, FIGS. 1, 2 and 3, a dispenser 2 for dispensing measured amounts of the material to be brewed such as, for example, ground coffee, and a brewing assembly 3 for effecting the brewing of the material to thereby produce a brewed liquid. The dispenser 2 and the brewing assembly 3 are each removably mounted on a channel-shaped frame member 4, as will be discussed in greater detail presently.

The frame member 4 includes a vertical rear wall 5 and two forwardly projecting, parallel side walls 6 and 7, FIGS. 1, 3 and 5.

The dispenser 2 includes a substantially U-shaped base 8, FIGS. 1 and 3, which includes a horizontally extending bottom wall 9 and two upwardly extending, substantially parallel side walls 10 and 11. The side walls 10 and 11 have outwardly projecting upper flange portions 12 and 13, respectively, which are suitably secured, such as, for example, by welding, to the bottom wall 14 of the reservoir 15 of the dispenser 2. The reservoir 15, in addition to the bottom wall 14, includes an upwardly extending substantially cylindrical-shaped side wall 16 and a removable cover member 17 mounted on the upper edge portion of the side wall 16.

A measuring cup 18 in the form of a substantially cylindrical-shaped tube is mounted in depending relation to the reservoir 15, with the upper end portion of the cup 18 secured in a complementary opening 19 in the front edge portion of the bottom wall 14 to the reservoir 15, FIG. 3. The lower end portion of the measuring cup 18 is mounted in a complementary opening 20 in the bottom wall 9 of the bracket 8, and the measuring cup 18 may be secured in such position in the bottom walls 14 and 9 by suitable means such as welding.

A shaft 21 extends through and is rotatably mounted in an opening 22 in the bottom wall 9 and in a bearing 23 in the bottom wall 14, FIG. 3. A rotary disc 24 is attached to a hub portion 25 by screws 26 extending through slots 27 in the hub portion 25 and threadedly engaged in the disc 24, FIGS. 3 and 4. The hub member 25 is attached to the upper end portion of the shaft 21 by suitable means such as screws 28 in position to support the rotary disc 24 in closely adjacent, spaced relation to the bottom wall 14 of the reservoir 15. If desired, the bearing 23 may have an outwardly projecting flange portion 29 disposed between the rotary disc 24 and the bottom wall 14 to thereby space the latter from each other.

A rotary cam plate 30 having a central hub portion 31 is secured to the lower end portion of the shaft 21 by suitable means such as a screw 32 in position whereby the hub 31 is disposed in abutting engagement with the lower face of the bottom wall 9 of the base 8, to thereby hold the shaft 21 against removal from the bottom walls 9 and 14 in an upward direction, FIG. 3.

A closure member or cover plate 33 is pivotally mounted on the bottom face of the bottom wall 9 of the base 8 by a suitable pivot such as a screw or bolt 34 having an enlarged head 35 underlying the plate 33, FIG. 9. The hub 31 of the cam plate 30 extends through a somewhat arcuate-shaped slot 36 in the cover plate 33, the plate 33 being disposed between the cam plate 30 and the bottom wall 9. The slot 36 is of such shape that the cover plate 33 may rotate horizontally around the pivot pin 34 between the normally closed position shown in solid lines in FIG. 9 and the open position shown in broken lines in FIG. 9.

A bumper 37 having a pad 38 made of suitable material such as, for example, rubber, projects from the bottom wall 9 of the base 8, and is disposed in position to engage a downwardly projecting lug 39 formed on the cover plate 33 in position to limit the opening movement of the cover plate 33 to that shown in FIG. 9. A tension coil spring 40 having one end portion connected to the side wall 10 of the base 8, and the other end portion connected to a lug 41 which projects upwardly through an opening 42 in the bottom wall 9, urges the cover plate 33 to rotate about the pin 34 from the normally closed position toward the aforementioned open position shown in solid lines and broken lines, respectively, in FIG. 9.

A cam follower 43 depends from the plate 33 in position to engage the outer peripheral edge portion of the cam plate 30, FIGS. 1 and 9. Throughout most of its circumference, the cam plate 30 is circular, FIG. 9, but a recess 44 is also afforded therein and extends through approximately a 60° arc. The cam plate 30 is so disposed relative to the plate 33 that when the cam follower 43 is disposed in engagement with the circular portion of the outer periphery of the cam plate 30, the plate 33 is held in normal, closed position as shown in solid lines in FIG. 9. When the follower 43 moves into the recess 44, the plate 33 is freed for movement around the pin 34 by the spring 40 in a counterclockwise direction, as viewed in FIG. 9, to thereby move it into the open position shown in broken lines in FIG. 9.

The cam plate 30 is caused to rotate once in a counterclockwise direction, as viewed in FIG. 9, in each cycle of operation of the novel brewing apparatus 1, as will be discussed in greater detail presently. Hence, it will be seen that the normally closed plate 33 is moved to open position during each cycle of operation of the brewing apparatus 1 to thereby uncover the bottom of the measuring cup 18 to discharge the ground coffee, or the like, therein downwardly.

The rotary disc 24 fits relatively snugly, but with a freely rotatable fit within the side wall 16 of the reservoir 15, FIGS. 3 and 4, and includes a section 45 spaced upwardly from the bottom wall 14 of the reservoir a greater distance than the remaining section 46. The section 45 defines an arcuate portion extending through approximately a 120° arc, while the other portion 46 comprises the remaining portion of the rotary disc 24. The portion 46 is provided with a plurality of spaced openings 47, FIG. 4, while the portion 45 is imperforate.

A hopper 48 is mounted on the cover member 17 of the reservoir 15 in communication with an opening 49 therein. The opening 48a is disposed substantially diametrically opposite to the opening 19, and the hopper 48 may be attached to the cover member 17 by suitable means such as rivets 48b. The hopper 48 may be filled with ground coffee, or the like, to be fed downwardly therefrom into the reservoir 15. During each rotation of the rotary disc 24 in a counterclockwise direction as viewed in FIG. 4, the openings 47 move past the upper end of the measuring cup 18 to thereby permit coffee to pass downwardly from the reservoir 15 through the openings 47 into the cup 18. The imperforate portion 45 of the rotary disc 24 is so disposed thereon that it is disposed over the upper end of the measuring cup 18 at all times that the plate 33 is disposed in position to uncover the bottom of the measuring cup 18. It can therefore be seen that the disc 24 is in the nature of an agitator which serves to agitate the coffee in the reservoir 15 to allow a portion of same at a predetermined time to pass downwardly through the apertures 47 into the cup 18. In spacing the disc 24 a slight distance above the bottom of the reservoir, binding between the disc and coffee in the bottom of the reservoir underneath the disc is eliminated.

Rotation of the rotary disc 24 and oscillation of the cover plate 33 are effected in timed relation to the actuation of the brewing assembly 3, as will be discussed in greater detail presently.

The brewing assembly 3 embodies a supporting frame 48 including a rear wall 49, an upper wall 50 and a lower wall 51, FIG. 3. A front wall 52 is secured to the top and bottom walls 50 and 51, and a brewing container 53 is rotatably mounted on the frame 48 in forwardly projecting relation to the front wall 52 for a purpose which will be discussed in greater detail presently.

The brewing container 53 embodies a substantially cylindrical-shaped or cup-shaped body portion 54, FIG. 10, having a bottom wall 55 and cylindrical-shaped side wall 56.

A brewing basket 57, including an imperforate bottom wall 58 and a tapered perforated or foraminous side wall 59 is mounted in the container 53. The basket 57 includes a reinforcing ring 60 on the upper end portion thereof which is of such size that it intimately engages the upper inner surface of the side wall 56 of the brewing container 53. The basket 57 tapers downwardly and inwardly from the ring 60 to thereby afford a collecting chamber 56a between the side walls 56 and 59.

A brew stem 61 is mounted in and projects upwardly from the bottom wall 58 of the basket 57. The brew stem 61 includes an elongated shank 62 having a radially outwardly projecting flange 63 on the lower end portion thereof, and a transversely extending pin 64 projecting from the upper end portion thereof to thereby afford a handle. A bushing 65 is mounted on the shank 62 of the brew stem 61 and is threaded into an opening 66 in the bottom wall 55 of the container 53. The bushing 65 is clampingly engaged with the flange 63 to thereby support the shank 62 in perpendicular relation to the bottom wall 55. The bushing 65 also projects through the bottom wall 58 of the basket 57 and is effective to clamp it against the bottom wall 55 of the brewing container 53, FIG. 10.

A plurality of radially arranged apertures 67 are provided in the stem portion 62 of the brew stem 61 just above the bushing 65, FIG. 10. A movable sleeve 68 is freely carried on the shank portion 62 of the brew stem 61 and is of such size as to afford an annular passageway 69 between the outer surface of the shank portion 62 and the inner surface of the sleeve 68. In normal brewing position, the sleeve 68 rests on the bushing 65, but another pin 70 is mounted in and extends transversely through the shank portion 62 of the brew stem 61 between the sleeve 68 and the pin 64, in such position that the sleeve 68 may be moved upwardly away from the bushing 65. When the sleeve 68 is disposed in normal position, wherein it rests on the bushing 65, it is disposed radially outwardly of the openings 67. When the sleeve 68 is disposed in actuated position, wherein it is in engagement with the pin 70, the lower end portion of the sleeve 68 is disposed above the openings 67.

The shank portion 62 of the brew stem 61 is hollow for a portion of its length from the lower end thereof to a point above the openings 67. When the brew stem 61 is disposed in normal position in the brewing chamber 53, as previously described, the hollow lower end portion of the shank portion 62 is in communication with an opening 71 which extends through a boss 72 formed on the outer face of the bottom wall 55 of the brewing container 53. The other end of the opening 71 is disposed in communication with an opening 73 extending upwardly therefrom through the side wall 56 into communication with a radially outwardly opening passageway 74, FIG. 10.

At its outer end, the passageway 74 is disposed in communication with a passageway 75 formed in a substantially cylindrical-shaped fitting 76. The fitting 76 has a centrally disposed boss 77 on one end thereof, the boss 77 being threaded into and extending through the side wall 56 of the brewing container 53. The fitting 76 also has a radially outwardly projecting flange 78 on the inner end portion thereof, and a sleeve 79 is removably mounted on the outer end portion of the fitting 76 in closely fitting relation thereto. A retainer plate 80 is threadedly mounted on a boss 81 on the outer end portion of the fitting 76 in position to clamp the sleeve 79 tightly against the flange 78, FIG. 10.

The sleeve 79 has an inlet passageway 82 and an outlet passageway 83 extending radially therethrough, the passageways 82 and 83 being disposed in communication with annular-shaped grooves 84 and 85, respectively, formed in the outer peripheral surface of the fitting 76. The groove 84 is disposed in communication with the inner end portion of the passageway 75, thereby connecting the inlet opening 82 to the passageway 75 and, therefore, through the passageways 73, 71 and the perforations 67 in the brew stem 61 to the interior of the brewing container 53. A suitable coupling member such as, for example, a tube 82a, may be connected to the inlet opening 82 for feeding a brewing liquid such as water, or the like, thereinto.

The outlet opening 83, which it will be remembered is in communication with the groove 85, is connected to a passageway 86 extending axially through the fitting 76, to thereby connect the collecting chamber 56a in the brewing container 53 to the outlet opening 83. The retaining plate 80, mounted on the boss 81 of the fitting 76, is effective to seal the outer end of the opening 86.

Diametrically opposite to the fitting 76, the brewing chamber 53 is attached by screws or bolts 87 to a radially outwardly projecting flange 88 formed on one end of a shaft 89, FIG. 10. The shaft 89 is journalled in and projects through a bearing 90 mounted in an opening 91 in the front wall 52 of the supporting frame 48, the bearing 90 having a front flange 92 abuttingly engaged with the front face of the wall 52, and a snap ring 93 retaining the bearing 90 in position in the wall 52. When the shaft 89 is disposed in normal position in the bearing 90, the flange 88 thereof is disposed in abutting engagement with the front face of the flange 92, and the shaft 89 is releasably retained in such position by suitable means such as a snap ring 94 mounted thereon and engaged with the other end of the bearing 90, FIG. 10.

The other end of the shaft 89 is journalled in a boss 95 formed on the front end of a motor 96, the boss 95 projecting through the rear wall 49 of the supporting frame 48, FIG. 3, and the motor 96 being secured to the wall 49 by suitable means such as bolts, or the like, not shown. The shaft 89 may be secured to the drive shaft of the motor 96 by suitable coupling means, not shown, so that upon energization of the motor 96, the shaft 89 is rotated in the bearing 90 to thereby rotate the brewing container 53 in a counterclockwise direction as viewed in FIG. 1.

The brewing container 53 also includes a cover member 97 which includes a resilient gasket member 98, made of suitable material such as, for example, neoprene rubber, or the like, which is disposed in sealing relation with the upper edge portion of the side wall 56 of the brewing chamber 53 when the cover member 97 is disposed in closed position, as shown in FIG. 10.

A channel-shaped bracket 99, having two substantially parallel side walls 100 and 101 projecting from the bight portion 102 thereof, is mounted on the cover 97 by a bolt 103 and nut 104, FIG. 10. The bolt 103 is secured to the cover 97 and is outwardly threaded and extends through the bight portion 102 to thereby afford an adjustment for moving the bracket 99 inwardly and outwardly relative to the outer face of the cover member 97, the nut 104 being also outwardly threaded and threadingly engaged with the bight portion 102. A set screw 105 extends through and is threadedly engaged in the side wall 100 of the bracket 99 in position to hold the nut 104 in adjusted position on the bolt 103.

The brewing container 53 has two ears 106 and 107 projecting radially outwardly from the side walls 56 thereof, FIGS. 1, 5 and 10. The bracket 99 is disposed an the ears 106 and 107 with the side walls 100 and 101 disposed in closely adjacent relation to the outer faces of the ears 106 and 107, respectively. A pin 108 extends through one end portion of the side walls 100 and 101 and the ears 106 and 107 to thereby pivotally mount the bracket 99 and, therefore, the cover member 97, on the ears 106 and 107.

The pin 108 includes an elongated, substantially straight main body portion or shank 109 having a substantially L-shaped end portion 110 projecting rearwardly from one end thereof, FIG. 5. The main body portion 109 has an outwardly projecting flange or collar 111 thereon, disposed inwardly of the end portion 110, and it is the main body portion 109 which projects through the side walls 100 and 101 and the ears 106 and 107 in mounting the bracket 99 on the brewing container 53, as shown in FIG. 5. When the pin 108 is disposed in position to pivotally mount the cover 97 on the brewing container 53, the collar 111 is preferably disposed in abutting engagement with the outer face of the ear 107, and a snap ring 112 may be mounted on the other end portion of the main body portion 109 to thereby hold the pin 108 in the bracket 99 and the ears 106 and 107. The pin 108 may then be secured to the bracket 99 by suitable means such as by welding the collar 111 to the side wall 101.

A cam follower 113 in the form of a roller mounted on a shaft or pin 114 is rotatably mounted on the other end portion of the bracket 99, FIGS. 1 and 5. The roller 113 is mounted on and disposed in centered position between the side walls 100 and 101, FIG. 5, and projects radially outwardly beyond the bracket 99, FIG. 1.

A reinforcing rod or shaft 115, which also acts as a cam follower during a portion of the operation of the brewing apparatus 1, as will be discussed in greater detail presently, is mounted in and extends between the side walls 100 and 101 of the bracket 99, substantially midway between the pins 108 and 114, and in parallel relation thereto. The shaft 115 may be held in position in the side walls 100 and 101 by suitable means such as, for example, snap rings 116, FIGS. 1 and 10.

A cam plate 117 is mounted on the front wall 52 of the supporting frame 48, FIGS. 1 and 5, in outwardly spaced relation thereto. The cam plate 117 is attached to the supporting frame 48 by two bolts 118 and 119 extending through the cam plate 117 and threaded into the front wall 52 of the supporting frame 48. Two spacer members 120 and 121 are disposed on the bolts 118 and 119, respectively, in position to dispose the cam plate 117 outwardly in front of the plate 52 in the plane of the radii of the roller 113.

A two-piece cam plate 122 embodying two plate members 123 and 124 mounted on the front face of the front wall 52 of the supporting frame 48 by suitable means such as screws 125, is disposed on the other side of the fitting member 76 from the cam plate 117. The two plate members 123 and 124 are disposed in spaced relation to each other to thereby afford a cam slot 126 therebetween, for a purpose which will be discussed in greater detail presently.

The substantially L-shaped end portion 110 of the mounting shaft or pin 108 is disposed in such position that during a revolution of the brewing container 53 with the shaft 89, the end portion 110 of the pin 108 passes through the cam slot 126 to thereby actuate the cover 97, as will be discussed in greater detail presently.

If desired, a brace 127 may have one end portion extending through and mounted in the cam plate 117, and the other end portion attached to the sleeve 79 by suitable means such as welding to thereby support the outer end of the fitting 76 and afford additional support for the brewing chamber 53.

It will be remembered that in the coffee dispenser apparatus 2, a cam plate 30 is mounted on the lower end portion of the shaft 21 to rotate the rotary disc 24 and actuate the cover plate 33. Rotation of the cam plate 30 is afforded by a drive shaft 128 which is rotatably mounted in the supporting frame 48 in position to be driven by the shaft 89, FIGS. 3 and 10, as will be discussed in greater detail presently.

The drive shaft 128 embodies an upper end portion in the form of a sleeve 129 and a lower end portion or shank in the form of a solid shaft 130, FIGS. 6. The shank 130 is telescopingly mounted in the sleeve 129, the latter having two diametrically opposed slots 131 formed in the lower end portion thereof, and the upper end portion 130 of the drive shaft 128 having a pin 132 extending transversely therethrough and engaged and disposed in the slots 131 for vertical movement therein longitudinally of the latter. The lower end portion of the sleeve 129 is rotatably journalled in a bearing 133 fixed in an opening 134 in the top wall 50 of the supporting frame 48. The lower end portion of the shank 130 of the drive shaft 128 is rotatably mounted in a sleeve 135 which extends through the lower wall 51 of the supporting frame 48, FIG. 6. The sleeve 135 is outwardly threaded and has a nut 136 formed on the lower end portion thereof. The sleeve 136 is threadedly engaged in and extends through a bushing 137 fixedly mounted in the opening 138 in the bottom wall 51 of the supporting frame 48, and two snap rings 139 and 140 on opposite sides of the sleeve 135 hold the lower end portion 130 of the drive shaft 129 against longitudinal sliding movement relative to the sleeve 135. A lock nut 141 may be mounted on the outer periphery of the sleeve 135 in position to engage the lower face of the bushing 137 to thereby secure the sleeve 135 against rotation, if such should be desired.

A helical gear 142 is mounted on the shank 130 for rotation therewith, and is normally engaged with another spiral gear 143 mounted on the shaft 89, FIGS. 6 and 10. Thus it will be seen that upon rotation of the shaft 89 by the motor 96, the drive shaft 128 is rotated in a counterclockwise direction as viewed in FIGS. 5 and 10.

A cam plate 144, FIGS. 3, 6, 7 and 8, is mounted on the upper end portion of the sleeve 129 of the drive shaft 128 and is secured thereto for rotation therewith. The major portion of the outer periphery of the cam plate 144 is circular in shape, but the cam plate 144 has an outwardly projecting tongue 145 thereon. A pin 146 depends from and is carried by the cam plate 30 on the dispenser 2 when the dispenser 2 is disposed in normal position on the supporting frame 4, the pin 146 being disposed in the path of travel of the tongue 145, FIGS. 3, 6 and 9. Hence, it will be seen that during each rotation of the cam plate 144 with the sleeve 129, the tongue 145 through its driving engagement with the pin 146 is effective to rotate the cam 30 in a counterclockwise direction as viewed in FIG. 4.

Three other cams 147, 148 and 149 are also mounted on the sleeve 129 for rotation therewith. The major portion of the outer periphery of each of the cams 147–149 is circular. However, each of the cams 147–149 embodies a recess 150, 151 and 152, respectively, in the outer peripheral edge portion thereof. The cams 147–149 are disposed in radial alignment with three switches 153, 154 and 155, respectively, and the switches 153–155 each includes an actuating member 156 having a cam follower 157 thereon, the actuating members 156 of each of the switches 153–155 being disposed in such position that the cam followers 157 thereof are retained in engagement with the outer peripheral edges of the cams 147–149, respectively.

In the operation of our novel brewing apparatus 1, the beverage container 53 is normally disposed in the position shown in solid lines in FIG. 13, wherein the cover 97 thereof is disposed in open position, and the beverage container is tilted downwardly at an acute angle to the horizontal so that all liquid may drain therefrom. During a cycle of operation of the brewing apparatus 1, the beverage container 53 rotates in a counterclockwise direction from the position shown in FIG. 13 successively through the positions shown in FIGS. 11, 1 and 12, and back to the position shown in solid lines in FIG. 13.

It will be seen that when the beverage container 53 is disposed in normal position as shown in FIG. 13, the end portion 110 on the pin 108 is engaged with the substantially circular-shaped lobe 158 on the cam plate 123, to thereby positively hold the cover 97 in open position. As the beverage container 53 rotates in a counterclockwise direction from the position shown in FIG. 13 toward the position shown in FIG. 11, the end portion 110 of the pin 108 rides along the lobe 158 to thereby insure that the cover 97 remains in open position. As the beverage container 53 nears the position shown in solid lines in FIG. 11, the cam follower 113 on the bracket 99 engages the lower edge portion of the upper end 159 of the cam plate 117 and rides upwardly along the edge portion 159 during continued rotation of the beverage container 53 into the position shown in solid lines in FIG. 11. Thereafter, as the beverage container 53 continues to rotate in a counterclockwise direction, the crossbar 115 on the bracket 99 engages the edge portion 159 on the cam plate 117 to thereby raise the cover 97 toward portially closed position as shown in broken lines in FIG. 11.

During continued rotation of the brewing container 53, the cover member 97 falls downwardly into closed position from the position shown in broken lines in FIG. 11 and the rotation of the brewing chamber 53 moves the cam follower 113 into engagement with the arcuate cam surface 160 on the cam plate 117, as shown in FIG. 1. The cam surface 160, the cam follower 113, the cover member 97, and the side walls 56 of the beverage container 53 are so disposed relative to each other that when the brewing container 53 is disposed in the position shown in FIG. 1, the cam plate 117 is effective to hold the cover member 97 in tightly sealed engagement with the side walls 56. This position is known as the "brewing" position of the brewing container 53, and the container 53 is stopped for a short period of time in this position during a cycle of operation of the brewing apparatus 1, as will be discussed in greater detail presently.

Thereafter, during continued rotation of the brewing container 53 in a counterclockwise direction from the position shown in FIG. 1, the roller 113 rides along the cam surface 160 to maintain the cover 97 in sealed engagement with the side walls 56. Then, as the cam follower 113 rides off from the cam surface 160, it rides onto the surface 161 on the cam plate 117 to thereby permit the cover 97 to fall into partially open position as shown in broken lines in FIG. 12. As the counterclockwise rotation of the brewing container 53 continues, the cam roller 113 rides off from the surface 161 and permits the cover member 97 to fall into a more fully open position. In this latter position, the container 53 is so disposed relative to the cam 122 that the opening movement of the cover 97 moves the end portion 110 of the pin 108 into engagement with the lower end portion of the cam surface 162 on the cam plate 123 to thereby limit the opening movement of the cover 97 so that the cover 97 is so disposed relative to the remainder of the brewing container 53 that the inner face of the cover member 97 underlies the open end of the brewing chamber 53.

The position of the brewing chamber 53 shown in solid lines in FIG. 12, and the position thereafter for approximately the next ninety degrees of rotation, is known as the "flushing" position, and during this time the interior of the container 53 is flushed with water, as will be discussed in greater detail presently. We have found it desirable, during this flushing operation of the cycle of operation to maintain the cover member 97 in underlying relation to the open end of the container 53 so that the liquid flowing from the container 53 pours downwardly over the cover 97 and thereby washes off the same. The engagement of the end portion 110 on the pin 108 with the lower end portion of the cam surface 162 on the cam plate 123 is effective to hold the cover member 97 in underlying relation to the body portion of the container 53, as is illustrated in FIGS. 12 and 13, the weight of the cover 97 tending to rotate it around the pin 108 and thereby keeping the end portion 110 in engagement with the cam plate 122.

At the end of the flushing portion of the cycle of operation, the end portion 110 of the pin 108 rides onto the lower lobe 163 on the cam surface 162. Thereafter, the end portion 110 is engaged by the upper portion 164 of the cam surface 165 on the cam plate 124 and is moved thereby inwardly, or to the left as viewed in FIG. 12, into a recess 166 formed in the cam plate 123 between the lobes 158 and 163. When this occurs, the cover member 97 is swung toward fully opened position, and as the brewing container 53 continues to rotate in a counterclockwise direction toward the position shown in solid lines in FIG. 13, the end portion 110 of the pin 108 rides around the lower end portion of the lobe 158 into the aforementioned normal, at-rest position wherein the cover member 97 is held in fully opened position as shown in solid lines in FIG. 13.

During such a rotation of the brewing container 53, the rear end of the end portion 110 of the pin 108 follows a path of travel shown diagrammatically by the broken lines in FIG. 14.

In a normal installation of the brewing apparatus 1, the inlet conduit 85 on the fitting 76 may be connected through a suitable control device such as a solenoid operated valve 167 to a suitable source of water such as the conduit 168, FIG. 15. The outlet 83 on the fitting 76 may be connected by a suitable conduit 169 to a holding tank 170, into which the brewed liquid may be discharged for subsequent dispensing from the unit. The brewing apparatus 1 may be employed in vending machines or other units by itself, but it generally will be combined with a holding tank such as the holding tank 170.

The operation of the brewing apparatus 1 is automatic after a cycle of operation has been initiated. Such a cycle of operation may be initiated by substantially momentary closing of a switch such as the switch 171 shown in FIG. 17 to thereby close the circuit from one side 172 of a suitable source of electric power through a conductor 173, the switch 171, a conductor 174, the motor 96, and a conductor 175, back to the other side 176 of the line. It will be appreciated that the momentary closing of the switch 171 may be done manually or may be effected automatically by a liquid-level sensing device in the holding tank, or it may be closed by a proper coin mechanism, or the like.

In the normal, at-rest position of the brewing container 53, the cam follower 157 on the switch 155 is normally disposed in the recess 152 on the cam plate 149 so that the switch 155 is open. Upon energization of the motor 96 by the closing of the switch 171, the shaft 128 and, therefore, the cam plate 149 is rotated in a counterclockwise direction as viewed in FIG. 7 so that the cam follower 157 of the switch 155 rides upwardly out of the recess 152 onto the outer peripheral edge of the cam plate 149 to thereby close the switch 155. The switch 155 remains closed until the end of the rotation of the brewing container 53, at which time the follower 157 thereon again rides into the recess 152 to again open the switch 155.

The switch 154 is a double-acting switch, shown in FIG. 17 as having a movable contact 177 normally engaged with one fixed contact 178 and movable into engagement with another fixed contact 179. The cam follower 157 on the switch 154 is normally engaged with the outer peripheral edge portion of the cam plate 148 to thereby hold the contact 177 in engagement with the contact 178. With the switch 155 closed and the switch 154 disposed in its normal position as shown in FIG. 17, a circuit is completed from the side 172 of a line through a conductor 180, the switch 155, the conductor 181, the contacts 177 and 178, a conductor 182, the motor 96, and the conductor 175, back to the other side 176 of the line.

It will be remembered that after initiation of the cycle of operation by closure of the switch 171, the switch 155 is closed and remains closed until the end of a cycle of operation. Hence, so long as the contacts 177 and 178 of the switch 154 remain closed, the motor 96 is energized during a cycle of operation and the drive shaft 128 is rotated thereby. The recess 151 in the cam plate 148 is so positioned therein that when the brew chamber 53 is disposed in brewing position, such as shown in FIG. 1, wherein the cam follower 113 is disposed in engagement with the cam surface 160, the cam follower 157 on the switch 154 is disposed in the recess 151. Under these conditions, the contact 177 of the switch 154 is disposed out of engagement with the contact 178 and is disposed in engagement with the contact 179 to thereby open the circuit through the motor 96 and thereby deenergize the motor. When this occurs, the switch 154 may be effective to initiate operation of a timing mechanism 183, FIG. 17, connected to the contact 179 by a conductor 184 and connected to the conductor 175 by the conductor 185.

At the end of a predetermined period of time after the contact 177 has been moved into engagement with the contact 179, the timing mechanism 183 may be effective to connect the conductor 184 through a conductor 186, FIG. 17, to the motor 96 to thereby again complete a circuit through the motor 96, this circuit being from the contact 172, the conductor 180, the switch 155, the conductor 181, the contacts 177 and 179, the conductors 184 and 186, the motor 96, and the conductor 175, to the contact 176 to thereby again energize the motor 96. When this occurs, the cam follower 157 on the switch 154 rides out of the recess 151 on the cam plate 148 to thereby again move the contact 177 out of engagement with the contact 179 and into engagement with the contact 178 to again reestablish the earlier mentioned electrical circuit through the motor 96 from the switch 155 and the contacts 177 and 178.

When the contact 177 of the switch 154 is moved out of engagement with the contact 178 and into engagement with the contact 179, it will be seen that this is effective to close a circuit from the contact 172 through a conductor 180, the switch 155, the conductor 181, the contacts 177 and 179, a conductor 187, the solenoid valve 167, and the conductor 175, back to the other side 176 of the line to thereby energize the solenoid valve 167 and cause the same to be opened. When this occurs, hot water is fed from the line 168 through the solenoid valve 167, the conduit 184, the fitting 176, and the passageways 73 and 71, into the brewing stem 61 from which it is discharged outwardly through the opening 65 and upwardly through the sleeve 68 into the center of the brewing basket 57.

Previously, as the brewing container 53 had moved from its normal, at-rest position shown in solid lines in FIG. 13, into the brewing position shown in FIG. 1, the tongue 145 on the cam 147 through its driving engagement with the pin 146 was effective to rotate the cam 30 into position wherein the cam folower 43 on the cover plate 33 moves into the notch 44. This occurs as the open beverage container 53 is disposed directly below the measuring cup 18, the spring 40 being effective to snap the cover plate 33 into open position to thereby discharge the ground coffee, or the like, in the measuring cup 18 into the beverage container 53. Thereafter, as the cam plate 30 is rotated by the tongue 145, the cam follower 43 moves out of the recess 44 into engagement with the outer peripheral edge portion of the cam plate 30 to thereby again move the cover plate 33 into closed position.

Hence, it will be seen that when the hot water is fed through the valve stem 61 into the center of the brewing basket 57, when the brewing chamber is disposed in brewing position as shown in FIG. 1, the ground coffee to be brewed is disposed in the brewing basket 57 and the hot water fed from the brewing stem 61 is fed into intimate contact therewith. The brewed liquid may then feed outwardly through the foraminous side walls 59 of the brewing basket 57 into the chamber 61, and thence outwardly through the passageways 86, 85 and 83 and the conduit 69 into a suitable receptacle such as, for example, the holding tank 170.

At the close of the brewing portion of the cycle of operation, the timing mechanism 183 is effective to again initiate energization of the motor 96. As the switch 154 is again moved into normal position, wherein the contact 177 is engaged with the contact 178, the conductor 182 is again energized so that when the cam follower 157 on the switch 153 moves into the notch 150 on the cam plate 147, to thereby close the switch 153, the solenoid valve 167 is again connected across the line 172–176, this time by the conductor 180, the switch 155, the conductor 181, the contacts 177 and 178, the conductor 182, the conductor 188, the switch 153, the conductor 189, the conductor 187, and the conductor 175. This is during the flushing portion of the cycle of operation, and it will be remembered that during this portion of the cycle of operation the beverage container 53 is open and disposed in upside down position. Hence, the sleeve 68 rests on the pin 70 and water discharged from the opening 67 sprays outwardly against the side walls 59 of the brewing basket 57 and flows downwardly therealong over the cover 97 to thereby thoroughly wash the interior of the beverage container 53 and the exposed surfaces of the cover 97.

At the close of the flushing portion of the cycle of operation, the cam follower 157 on the switch 153 again rides out of the opening 150 onto the outer peripheral edge portion of the cam plate 147 to thereby open the switch 153 and close the solenoid valve 167. Shortly thereafter, the cam follower 157 on the switch 155 again moves into the recess 152 on the cam plate 149 to thereby open the switch 155 and stop operation of the motor 96 at the close of a cycle of operation.

The gears 142 and 143 on the shafts 128 and 89, respectively, are such that the shaft 128 makes one complete rotation during each rotation of the shaft 89. Thus, it will be seen that the cam plates 144 and 147–149 make one complete rotation during each rotation of the shaft 89 and the beverage container 53. This is also true of the rotary disc 24, so that a new charge of ground coffee is fed into the measuring cup 18 during each cycle of operation of the brewing apparatus 1 and is available for discharge into the brewing container 53 during the next succeeding cycle of operation.

One of the novel features of our brewing apparatus 1 is the manner in which the cam plates 144 and 147–149 may be readily adjusted so as to quickly and easily adjust the timing of the operation of the rotary disc 24, the cover plate 33, and the switches 153–155, relative to the rotary position of the brewing container 53.

It will be remembered that the sleeve 135 is rotatably mounted on the stem 130 of the drive shaft 128 and is threadedly engaged with the grommet 137. With this construction, rotation of the sleeve 135 in the grommet 137 is effective to raise or lower the stem 130 on the drive shaft 138 depending upon the direction of rotation of the sleeve 135. This vertical movement of the stem 130 is possible because of the pin and slot connection afforded between the stem 130 and the sleeve 129 by the pin 132 and the slot 131. It will be remembered that the helical gears 142 and 143 are at all times engaged with each other. The shaft 89 of the motor 96 is held stationary when the motor 96 is deenergized. Therefore, movement of the stem 130 past the shaft 89 is effective to cause the stem 130 to rotate, the teeth on the grooves 142 and 143 acting as cams for this purpose. This rotation of the stem 130 is effective to likewise rotate the sleeve 129, and therefore, the cams 144 and 147–149. Hence, it will be seen that the positioning of the cams 144 and 147–149 may be quickly and easily adjusted relative to the position of the shaft 89 and, therefore, of the beverage container 53, and that the adjustment afforded is relatively fine so as to insure accurate results.

With this construction of our novel brewing apparatus, it will be seen that the dispensing mechanism 2 and the brewing apparatus 3 are readily separated from each other, the only driving connection afforded being the abutting relationship of the tongue 145 on the cam 144 with the pin 146 on the cam 30.

Furthermore, it will be seen that the dispensing unit 2 and the brewing unit 3 are each quickly and easily mounted in and removed from the supporting frame 4. Thus, it will be seen that the dispensing unit 2 has two rods 190 and 191, FIGS. 1 and 2, mounted in, and extending between, the side walls 10 and 11 of the U-shaped channel 8, with the rod 191 disposed vertically below the rod 190 in parallel relation thereto. Two upwardly opening slots 192 are formed in the front end portion of the upper edge of the walls 6 and 7, respectively, of the frame 4 in position to receive the opposite ends of the pin 190. Similarly, two rearwardly and downwardly extending slots 193 are formed in the side walls 6 and 7, respectively, in position to receive the opposite end portions of the pin 191. A locking slide or pawl 194 having an elongated slot 195 is slidably and pivotally mounted on a pin 196 which extends through the slot 195 and is threaded into the side wall 7. Another pin 197 extends through the slot 195 forwardly of the pin 196 and is also threaded into the side wall 7. A tension coil spring 198 is connected between the rear end portion of the slide 194 and a pin 199 disposed forwardly thereabove, FIG. 2, so that the spring 198 is effective to urge the slide 194 to rotate in a counterclockwise direction as viewed in FIG. 2 around the pin 196. The slot 195 is substantially L-shaped, having an elongated main body portion 200 extending longitudinally of the slide 194 and a shorter leg 201 extending upwardly from the front end portion thereof. When the slide 194 is disposed in normal latching position as shown in solid lines in FIG. 2, wherein the portion 200 of the slot 195 is disposed in horizontally extending position and the pin 196 is disposed in abutting engagement with the rear edge of the slot 195, the front end portion of the slide 194 is disposed in overlying abutting engagement with the pin 191 projecting outwardly from the side wall 7. When it is desired to free this pin 191 from such latching engagement, the operator may move the slide 194 horizontally rearwardly into position wherein the pin 197 is disposed in vertical alignment with the leg 201. At this time, the coil spring 198 is effective to rotate the slide 194 around the pin 196 into the position shown in broken lines in FIG. 2, wherein the pin 197 is disposed in the leg 201, and the front end portion of the slide 194 is disposed rearwardly of the slot 193 in the side wall 7 to thereby free the pin 191 from movement upwardly and outwardly of the slot 193.

The slots 192 and 193 are so disposed relative to each other that with the slide 194 disposed in retracted position, and with the pin 191 disposed forwardly of the slots 193, the pin 190 may be moved downwardly into the slots 192 and, at the same time, the lower end portion of the dispenser 2 may be swung inwardly to thereby dispose the pin 191 in the slots 193. On the other hand, to remove the dispenser 2 from the frame 4, with the slide 194 disposed in unlatched position as shown in FIG. 2, the dispenser may first be raised vertically so as to free the pin 191 for forward swinging movement in the slot 193, and the bottom of the dispenser may then be swung forwardly and the dispenser raised vertically from the frame 4.

The side walls 6 and 7 also have two upper brackets 202 and two lower brackets 203, respectively, the brackets 202 and 203 having notches 204 and 205 therein, respectively. Two lugs 206 and 207 project upwardly from the top wall 50 of the frame 48, FIG. 5, and two pins 208 and 209 project outwardly from the lugs 206 and 207 in position to be disposed in the slots 204 in the brackets 202, on the side walls 6 and 7, respectively. Similarly, two flanges 210 and 211 project downwardly from the bottom wall 51 of the frame 48 and two pins 212 and 213 project outwardly therefrom in position to be disposed in the slots 205 in the brackets 203 in the side walls 6 and 7, respectively. A slide member 214 which is identical to the slide member 194 is pivotally mounted on the pins 215 and 216 for latching engagement with the pin 212 projecting outwardly from the side wall 7, a tension coil spring 217 urging the slide 214 into normal position.

With the parts of our novel latching mechanism disposed as shown in the drawings, the springs 198 and 217 are effective to yieldingly hold the slides 194 and 214, respectively, in latching position when the slides 194 and 214 are disposed in such position, and to yieldingly hold the slides 194 and 214 in unlatched position when they are disposed in the last mentioned position.

It will be seen that with this construction, and with the dispenser unit 2 removed from the frame 4, the brewing unit 3 may be quickly and easily removed from the frame 4 by moving the slide 214 into unlatched position wherein the front end portion thereof is disposed rearwardly of the pin 212 and then raising the brewing unit 3 upwardly while swinging the upper portion thereof outwardly. Insertion of the brewing unit 3 into operative position on the frame 4 may likewise be quickly and easily accomplished by reversing the aforementioned steps, namely, by lowering the pins 212 and 213 into the slots 205 while simultaneously lowering and swinging the pins 208 and 209 rearwardly into the slots 204.

It will be remembered that the cover plate 33 swings about the pin 34 in its movement from closed position shown in solid lines in FIG. 9 to open position shown in broken lines in FIG. 9. When the cover plate 33 is disposed in the open position shown in broken lines in FIG. 9, the end portion 218 thereof is disposed in outwardly projecting relation to the outer face of the side wall 11 on the U-shaped channel member 8 on the dispenser unit 2. This outward movement of the portion 218 is effected by the pivotal movement of the cover plate 33 during opening movement thereof under the urging of the spring 40. So as to afford a mechanical latching mechanism whereby opening of the cover plate 33 may be prevented during rotation of the beverage container 53 through a complete revolution, we have pivotally mounted a pawl 219 on the outer face of the side wall 11 of the dispenser unit 2 by means of a pin 220, FIG. 2. One end of the pawl 219 is pivotally connected to the lower end portion of the plunger 221 of a spring urged solenoid 222. When the solenoid is not energized, the spring, not shown, therein is effective to dispose the plunger 221 in extending position to thereby dispose the lever 219 in normal position as shown in solid lines in FIG. 2, wherein the lever 219 is disposed above the bottom edge of the U-shaped member 8.

If, during the servicing of our novel brewing apparatus, or at other times, it is desired to run the apparatus through a complete cycle of operation without dispensing brewing material into the brewing container 53, such as, for example, when it is desired to merely flush out the brewing container 53, this may be readily accomplished by the operator by first energizing the solenoid 222 by suitable circuitry, not shown, to thereby cause the lever 219 to be rotated about the pin 220 into the position shown in broken lines in FIG. 2, wherein the rear end portion of the lever 219 is disposed below the bracket 8 in the path of movement of the rear end portion 218 of the cover plate 33. When the lever 219 is disposed in this position, it is effective to prevent the cover plate 33 from being moved by the spring 40 from covering relation to the bottom of the measuring cup 18 and, therefore, when the lever 219 is disposed in such position, the dispenser unit 2 is not effective to dispense brewing material therefrom even though the brewing apparatus 1 is run through an otherwise normal cycle of operation.

From the foregoing it will be seen that we have afforded a novel brewing apparatus which is effective and efficient in operation and may be readily and economically produced commercially.

Also, it will be seen that our novel apparatus includes several novel component parts such as, for example, a novel brewing chamber and controls therefor; novel timing mechanism; novel brewing material dispensing mechanism; and novel mounting mechanism for mounting brewing apparatus or dispensing apparatus, or the like.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A brewing apparatus for subjecting brewing material to a brewing liquid to produce a brewed liquid and separating said brewed liquid from said brewing material, said apparatus comprising supporting means, a brewing container rotatably mounted on said supporting means for rotation from a normal position through a brewing-material-receiving position, a brewing position, and a flushing position back to said normal position, means on said supporting means for feeding such brewing material into said container during movement of said container through said brewing-material-receiving position, means for feeding liquid into and out of said container during said rotation of the latter, and means for opening and closing said container, said last named means comprising mounting means fixedly mounted on said container, a cover, a pivot member pivotally mounting said cover on said mounting means, cam means mounted on said supporting means, and means connected to said cover member and engageable with said cam means during such a rotation of said container for opening and closing said cover, said means engageable with said cam means including said pivot member for opening said cover.

2. A brewing apparatus for subjecting brewing material to a brewing liquid to produce a brewed liquid and separating said brewed liquid from said brewing material, said apparatus comprising supporting means, a brewing container rotatably mounted on said supporting means for rotation from a normal position through a brewing-material-receiving position, a brewing position, and a flushing position back to said normal position, means on said supporting means for feeding such brewing material into said container during movement of said container through said brewing-material-receiving position, said container including a body portion, and a cover member, means projecting outwardly from said body portion, other means extending through said last named means pivotally mounting said cover member on said body portion for pivotal movement between open and closed positions relative thereto, means for feeding liquid into and out of said container during said rotation of the latter, and means for pivoting said cover member between said open and closed positions thereof, said last mentioned means including cam means mounted on said supporting means and operatively engageable with said other means to pivot said cover member during said rotation.

3. A brewing apparatus for subjecting brewing material to a brewing liquid to produce a brewed liquid and separating said brewed liquid from said brewing material, said apparatus comprising supporting means, a brewing container rotatably mounted on said supporting means for rotation from a normal position through a brewing-material-receiving position, a brewing position, and a flushing position back to said normal position, means on said supporting means for feeding such brewing material into said container during movement of said container through said brewing-material-receiving position, said container including a body portion, and a cover member, means projecting outwardly from said body portion, other means extending through said last named means pivotally mounting said cover member on said body portion for pivotal movement between open and closed positions relative thereto, means for feeding liquid into and out of said container during said rotation of the latter, and means for pivoting said cover member between said open and closed positions thereof, said last mentioned means including a cam follower mounted on and carried by said cover member in spaced relation to said other means, and two cam means mounted on said supporting means in spaced relation to each other in position to operatively engage said cam follower and said other means and thereby cam said cover member open and shut during said rotation.

4. A brewing apparatus for subjecting brewing material to a brewing liquid to produce a brewed liquid and separating said brewed liquid from said brewing material, said apparatus comprising supporting means, a brewing container rotatably mounted on said supporting means for rotation from a normal position through a brewing-material-receiving position, a brewing position, and a flushing position back to said normal position, means on said supporting means for feeding such brewing material into said container during movement of said container through said brewing-material-receiving position, said container including a body portion having a closed end and an open end, and a cover member pivotally mounted on said body portion for pivotal movement around a fixed axis for opening and closing said open end, means for feeding liquid into and out of said container during said rotation, and means for pivoting said cover member around said fixed axis between open and closed position relative to said body portion, said last mentioned means comprising two cam followers mounted on said cover in spaced relation to each other, and two cam means fixedly mounted on said supporting means in position to operatively engage said cam followers during said rotation to thereby move said cover member.

5. A brewing apparatus for subjecting brewing material to a brewing liquid to produce a brewed liquid and separating said brewed liquid from said brewing material, said apparatus comprising supporting means, a brewing container including a body portion having a closed end and an open end, and a cover member, said container being rotatably mounted on said supporting means for rotation from a normal position through a brewing-material-receiving position, a brewing position, and a flushing position back to said normal position, means on said supporting means for feeding such brewing material into said container during movement of said container through said brewing-material-receiving position, an elongated bracket extending across said cover member, pivot means extending through one end portion of said bracket and attached to said body portion for pivotally mounting said cover member for pivotal movement between open and closed position relative to said open end, a cam follower on the other end portion of said bracket, and means for so pivoting said cover member during said rotation, said last named means including two cam members fixedly mounted on said supporting means in position to engage said pivot means and said cam followers during said rotation of said container.

6. A brewing apparatus comprising a brewing container rotatable through a cycle of operation, means, including a shaft, for so rotating said container, means for feeding brewing liquid into said container and brewed liquid out of said container during said cycle of operation, and means for feeding brewing material into said container, said last mentioned means including means for holding a supply of said material above said container, and means including a cover plate for controlling said feeding of material, said cover plate being pivotally mounted on said means for holding a supply of material for movement between an open and a closed position, a spring urging said cover plate toward said open position, a cam having one peripheral edge surface normally engaged with said cover plate to hold the latter in said closed position against the urging of said spring, said cam having another peripheral edge portion engaged with said cover plate during a portion of said cycle of operation to thereby free said cover plate to said urging of said spring and permit movement of said plate to open position, and means for rotating said cam during said cycle of operation.

7. A brewing apparatus comprising a brewing container rotatable through a cycle of operation, means, including a shaft, for so rotating said container, means for feeding brewing liquid into said container and brewed liquid out of said container during said cycle of operation, and means for feeding brewing material into said container, said last mentioned means including means for holding a supply of said material above said container, and means including a cover plate for controlling said feeding of material, said cover plate being pivotally mounted on said means for holding a supply of material for movement between an open and a closed position, a spring urging said cover plate toward said open position, a cam having one peripheral edge surface normally engaged with said cover plate to hold the latter in said closed position against the urging of said spring, said cam having another peripheral edge portion engaged with said cover plate during a portion of said cycle of operation to thereby free said cover plate to said urging of said spring and permit movement of said plate to open position, and means for rotating said cam during said cycle of operation, and said last named means comprising an elongated shaft disposed transversely to said first mentioned shaft, gears on said shafts drivingly connecting said first mentioned shaft to said second mentioned shaft for rotation therewith, said second mentioned shaft having a portion longitudinally adjustable to thereby move said gears relative to each other and rotate said cam, without rotating said first mentioned shaft, to thereby adjust the position of said cam relative to said container.

8. A brewing apparatus comprising a brewing container rotatable through a cycle of operation, means, including a shaft, for so rotating said container, means for feeding brewing liquid into said container and brewed liquid out of said container during said cycle of operation, and means for feeding brewing material into said container, said last mentioned means including means for holding a supply of said material above said container, and means including a cover plate for controlling said feeding of material, said cover plate being pivotally mounted on said means for holding a supply of material for movement between an open and a closed position, a spring urging said cover plate toward said open position, a cam having one peripheral edge surface normally engaged with said cover plate to hold the latter in said closed position against the urging of said spring, said cam having another peripheral edge portion engaged with said cover plate during a portion of said cycle of operation to thereby free said cover plate to said urging of said spring and permit movement of said plate to open position, and means for rotating said cam during said cycle of operation, said last named means comprising an elongated shaft disposed transversely to said first mentioned shaft, a helical gear mounted on said second mentioned shaft for rotation therewith, another helical gear drivingly engaged with said first mentioned gear for rotating the latter, said other gear being mounted on said first mentioned shaft for rotation therewith, said first mentioned gear being adjustable along the axis of said second mentioned shaft to thereby rotate said second mentioned shaft relative to said first mentioned shaft and thereby adjust the position of said cam relative to said cover plate.

9. A brewing apparatus comprising a movable brewing container, means for feeding liquid into said container and brewed liquid out of said container, and means for feeding brewing material into said container, said last named means comprising a control plate pivotally mounted for movement between a normal position and an actuated position for controlling said feeding of brewing material, cam means normally holding said plate in said normal position, spring means connected to said plate in position to urge said plate toward said actuated position, and means for rotating said cam means to thereby alternately free said plate for movement by said spring and move said plate against the urging of said spring to thereby oscillate said plate between said normal and actuated positions.

10. A brewing apparatus comprising a rotatable brewing container, means for feeding liquid into said container and brewed liquid out of said container, and means for feeding brewing material into said container, said last named means including a dispensing passageway for brewing material, a cover plate pivotally mounted for movement between a normal position and an actuated position to thereby cover and uncover said passageway, a spring connected to said plate and urging the latter toward said actuated position, a cam follower on said plate, a cam rotatably mounted relative to said plate, said cam having an outer peripheral surface in the form of most of the arc of a circle with the remaining portion in the form of a recess, said cam normally having said arcuate portion of said surface disposed in engagement with said cam follower to thereby hold said plate in said normal position, said cam being ineffective to hold said plate out of said actuated position against the urging of said spring when said cam follower is disposed in said recess, and means for rotating said cam to thereby alternately move said arcuate portion and said remaining portion into engagement with said cam follower.

11. A brewing apparatus comprising a movable container, means for feeding liquid into said container and brewed liquid out of said container, and means for feeding brewing material into said container, said last named means comprising a dispenser having a discharge opening therein, a cover plate pivotally mounted on said dispenser for pivotal movement between one position wherein said plate is disposed in covering relation to said opening, and another position, wherein said plate is disposed out of covering relation to said opening, and means for quickly moving said plate from said other position to said one position, said means including a spring connected to said plate in position to move said plate between said one position and said other position and cam means normally holding said plate against the urging of said spring, said cam means being movable to position to release said plate to said urging of said spring.

12. In a beverage dispensing apparatus of the type embodying a material dispenser having a discharge opening therein, a liquid container rotatable through one complete rotation during each cycle of operation, and means for feeding liquid into and out of said container during said rotation, a cover plate pivotally mounted on said dispenser for pivotal movement thereon between a normal and an actuated position to thereby control dispensing of said material from said dispenser, means connected to said plate for oscillating said plate between said positions during a cycle of operation, and means for controlling said oscillation of said plate, said last named means comprising a lever pivotally mounted on said dispenser for movement between a holding position and a releasing position, said lever being disposed in position to abuttingly engage said plate and hold the latter against said oscillation when said lever is disposed in said holding position, said lever being disposed in position to free said lever for said oscillation when said lever is disposed in said releasing position.

References Cited in the file of this patent

UNITED STATES PATENTS

| | | |
|---|---|---|
| 822,974 | Morgan | June 12, 1906 |
| 841,392 | Hamilton | Jan. 15, 1907 |
| 1,129,393 | Huff | Feb. 23, 1915 |
| 1,286,496 | Barbieri | Dec. 3, 1918 |
| 1,553,668 | Burch | Sept. 15, 1925 |
| 1,693,932 | Lowe | Dec. 4, 1928 |
| 1,869,720 | Strand | Aug. 2, 1932 |
| 2,267,675 | Alfandre | Dec. 23, 1941 |
| 2,306,764 | Spindler | Dec. 29, 1942 |
| 2,439,861 | Pootjes | Apr. 20, 1948 |
| 2,570,703 | Overacker | Oct. 9, 1951 |
| 2,718,843 | Jones | Sept. 27, 1955 |
| 2,895,402 | Totten | July 21, 1959 |